(12) United States Patent
Kasahara et al.

(10) Patent No.: US 7,117,523 B2
(45) Date of Patent: Oct. 3, 2006

(54) BOOK ON-DEMAND SYSTEM

(75) Inventors: Seitaro Kasahara, Hachioji (JP); Mitsuo Motohashi, Hachioji (JP); Masahiko Kamei, Kodaira (JP); Yuichi Atarashi, Hino (JP)

(73) Assignee: Konica Corporation, (JP)

( * ) Notice: Subject to any disclaimer, the term of this patent is extended or adjusted under 35 U.S.C. 154(b) by 860 days.

(21) Appl. No.: 10/122,837

(22) Filed: Apr. 15, 2002

(65) Prior Publication Data

US 2002/0156740 A1    Oct. 24, 2002

(30) Foreign Application Priority Data

Apr. 18, 2001    (JP) .............................. 2001/119491

(51) Int. Cl.
*H04N 7/08* (2006.01)

(52) U.S. Cl. ........................................ 725/137; 705/52
(58) Field of Classification Search .................. 705/52; 725/60, 137; 412/19; 709/229
See application file for complete search history.

(56) References Cited

U.S. PATENT DOCUMENTS

| | | | | |
|---|---|---|---|---|
| 5,734,823 A | * | 3/1998 | Saigh et al. ................ | 709/229 |
| 5,986,690 A | * | 11/1999 | Hendricks ..................... | 725/60 |
| 6,012,890 A | * | 1/2000 | Celorio Garrido ........... | 412/19 |
| 6,213,703 B1 | * | 4/2001 | Garrido ....................... | 412/19 |

FOREIGN PATENT DOCUMENTS

WO    WO 0072460 A1 * 11/2000

OTHER PUBLICATIONS

IBM Tech. Discl. Bull. No. 440, "Internet Personal Publisher", p. 225, (Dec. 2000).*

* cited by examiner

Primary Examiner—Salvatore Cangialosi
(74) Attorney, Agent, or Firm—Cantor Colburn LLP

(57) ABSTRACT

A book on-demand system having reading data for reading book contents and printing and bookbinding data for printing and bookbinding on the server thereof and also having a function to transmit the reading data to a reading device via a network at a user's request and also transmit the printing and bookbinding data to a printing and bookbinding device, wherein the server separately handles reading charge data concerning a reading charge applied to reading data transmission and printing and bookbinding charge data concerning a printing and bookbinding charge applied to printing and bookbinding processing.

20 Claims, 6 Drawing Sheets

FIG. 5

SELECT EITHER ONE OF THE FOLLOWING
BUTTONS WHEN YOU PURCHASE

| DOWNLOADING OF e-BOOK IS REQUIRED | PRINTING AND BOOKBINDING OF e-BOOK IS REQUIRED |

DOWNLOADING COSTS YOU 500 JAPANESE YEN, AND PRINTING AND BOOKBINDING COSTS 1,500 YEN

SELECT EITHER ONE OF THE FOLLOWING BUTTONS WHEN YOU PURCHASE

AS YOU HAVE PURCHASED DOWNLOADING OF e-BOOK, PRINTING AND BOOKBINDING COSTS YOU ONLY 1,000 YEN

| I PURCHASE DOWNLOADING OF e-BOOK | I PURCHASE PRINTING AND BOOKBINDING OF e-BOOK |

⚫
⚫
⚫

BOOK ON-DEMAND SYSTEM

BACKGROUND OF THE INVENTION

The present invention relates to technology for a book on-demand system which is arranged such that reading data or printing and bookbinding data is downloaded from the server via a network by using a terminal so that the data can be read on a user terminal side or output for printing and bookbinding on a printing and bookbinding terminal side.

As an example of electronic publishing, there is a demand for providing publications for users by downloading digital data related to books and the like from the server connected to the Internet and then printing out the data.

However, providers of digital data related to books and the like tend to suppress provisions of digital data related to books and the like for which copyright royalties can be expected because they worry that the digital data can be unrestrictedly duplicated. Digital data related to books and the like includes literature, treatise, dictionaries, magazines and other literary works and may also include photos and pictures. Further, photograph collections, books of paintings and atlas which are no-text publications are also included in digital data related to books and the like.

Published Unexamined Japanese Patent Application No. H07-239828 discloses technology which makes it possible to provide only users authenticated by a copyright server with decryptable encryption from a document server and transfer the document to printing agents corresponding to users so that each agent can decrypt the encryption and print out the document. According to the description of the publication, this technology can protect electronic publishing from illicit copying.

Published Unexamined Japanese Patent Application No. H06-103286 discloses technology in which, when a user inputs a command to transmit duplication of a book via a modem, the copyright royalty payment program intercepts the duplication command to put on hold the duplication action and displays copyright royalty payment information which is stored in a book's text or a file accompanying the book. According to the description of the publication, this technology makes it possible for the author and the publishing company to easily and reliably protect the literary work (book)'s copyright by providing a means for requesting copyright royalties when a reader tries to duplicate either a part of or the entire soft copy book.

Moreover, a conventional printing charge processing employs a system which records the number of successfully printed pages one by one and based on the accumulated count, a charge is applied.

On the other hand, upon sending reading data to users from the system side, the electronic publications system for reading applies a "contents price" which is for the contents of the book. Further, upon performing printing and bookbinding, the printing and bookbinding system applies the "contents price" together with a "container price" which is for processing printing and bookbinding. Furthermore, the electronic publications system for reading and the printing and bookbinding system have been separate, independent systems.

For this reason, a charge for printing and bookbinding after reading, which is applied when printing and bookbinding is performed after reading data has been transmitted and the contents price has been paid, is the same as a printing and bookbinding charge which is applied when printing and bookbinding is performed without receiving the reading data. In this case, no consideration is given to the possibility that there is an unfair aspect.

SUMMARY OF THE INVENTION

Accordingly, an object of the present invention is to provide a book on-demand system which enables users to quickly and accurately obtain publications by means of electronic publishing, making a licit payment at a fair charge.

Further, another object of the present invention is to realize an easy-to-use, book on-demand system which integrates an electronic publications system for reading and a printing and bookbinding system.

That is, in order to solve the aforementioned problems, the invention of the application is attained by any one of structures (1) through (19) which will be described below.

(1) A book on-demand system having reading data for reading book contents and printing and bookbinding data for printing and bookbinding on the server thereof and also having a function to transmit the reading data to a reading means via a network according to a user's request and also transmit the printing and bookbinding data to a printing and bookbinding means, wherein reading charge data concerning a reading charge applied to reading data transmission and printing and bookbinding charge data concerning a printing and bookbinding charge applied to printing and bookbinding processing are separately handled.

In structure (1), reading charge data concerning a reading charge applied to reading data transmission and printing and bookbinding charge data concerning a printing and bookbinding charge applied to printing and bookbinding processing are separately handled in the same book on-demand system; thereby, it is possible to execute a licit and fair charge.

(2) A book on-demand system having reading data for reading book contents and printing and bookbinding data for printing and bookbinding on the server thereof and also having a function to transmit the reading data to a reading means via a network according to a user's request and also transmit the printing and bookbinding data to a printing and bookbinding means, wherein reading charge data concerning a reading charge applied to reading data transmission and printing and bookbinding charge data concerning a printing and bookbinding charge applied to printing and bookbinding processing are separately handled, and also a plurality of charge amount determination means are provided for each of said reading charge data and said printing and bookbinding charge data.

In structure (2), reading charge data concerning a reading charge applied to reading data transmission and printing and bookbinding charge data concerning a printing and bookbinding charge applied to printing and bookbinding processing are separately handled in the same book on-demand system, and also a plurality of charge amount determination means are provided for each of said reading charge data and said printing and bookbinding charge data; thereby, it is possible to execute a licit and fair charge.

(3) A book on-demand system according to structure (1) or structure (2), wherein charges are to be gradually reduced when the same user uses reading data or printing and bookbinding data related to the same contents.

In structure (3), reading charge data concerning a reading charge applied to reading data transmission and printing and bookbinding charge data concerning a printing and bookbinding charge applied to printing and bookbinding processing are separately handled in the same book on-demand system, and also charges are to be gradually reduced when the same user uses reading data or printing and bookbinding data related to the same contents; therefore, it is possible to execute a licit and fair charge.

(4) A book on-demand system according to structure (3), wherein charges are not reduced when a user who has used printing and bookbinding data re-uses the printing and bookbinding data related to the same contents.

In structure (4), charges are to be gradually reduced when the same user uses reading data or printing and bookbinding data related to the same contents, and charges are not reduced when a user who has used printing and bookbinding data re-uses the printing and bookbinding data related to the same contents; therefore, it is possible to execute a licit and fair charge.

(5) A book on-demand system according to structure (1) or structure (2), wherein charges are to be reduced when a user having a history of using reading data uses printing and bookbinding data related to the same contents.

In structure (5), reading charge data concerning a reading charge applied to reading data transmission and printing and bookbinding charge data concerning a printing and bookbinding charge applied to printing and bookbinding processing are separately handled in the same book on-demand system, and also charges are to be reduced when a user having a history of using reading data uses printing and bookbinding data related to the same contents; therefore, it is possible to execute a licit and fair charge.

(6) A book on-demand system according to structure (1) or structure (2), wherein charges are to be reduced when a user having a history of using reading data uses reading data related to the same contents.

In structure (6), reading charge data concerning a reading charge applied to reading data transmission and printing and bookbinding charge data concerning a printing and bookbinding charge applied to printing and bookbinding processing are separately handled in the same book on-demand system, and also charges are to be reduced when a user having a history of using reading data uses reading data related to the same contents; therefore, it is possible to execute a licit and fair charge.

(7) A book on-demand system according to structure (1) or structure (2), wherein charges are to be reduced when a user having a history of using printing and bookbinding data uses reading data related to the same contents.

In structure (7), reading charge data concerning a reading charge applied to reading data transmission and printing and bookbinding charge data concerning a printing and bookbinding charge applied to printing and bookbinding processing are separately handled in the same book on-demand system, and also charges are to be reduced when a user having a history of using printing and bookbinding data uses reading data related to the same contents; therefore, it is possible to execute a licit and fair charge.

(8) A book on-demand system according to structure (1) or structure (2), wherein charges are not reduced when a user having a history of using printing and bookbinding data uses printing and bookbinding data related to the same contents.

In structure (8), reading charge data concerning a reading charge applied to reading data transmission and printing and bookbinding charge data concerning a printing and bookbinding charge applied to printing and bookbinding processing are separately handled in the same book on-demand system, and also charges are not reduced when a user having a history of using printing and bookbinding data uses printing and bookbinding data related to the same contents; therefore, it is possible to execute a licit and fair charge.

(9) A book on-demand system having reading data for reading book contents and printing and bookbinding data for printing and bookbinding on the server thereof and also having a function to transmit the reading data to a reading means via a network according to a user's request and also transmit the printing and bookbinding data to a printing and bookbinding means, wherein a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled.

In structure (9), a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled; thereby, it is possible to execute a licit and fair charge.

(10) A book on-demand system according to structure (9), wherein said reading charge includes a contents price for book contents, and said printing and bookbinding charge includes the contents price and a container price for performing printing and bookbinding.

Herein, a "price" is a value (amount of money) of information which users are requested to pay for receiving goods or services. Further, a "charge" is what users are requested to pay after the "priced" information has been transmitted and received via the system.

In structure (10), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled; thereby, it is possible to execute a licit and fair charge.

(11) A book on-demand system according to structure (9) or structure (10), wherein said charge for printing and bookbinding after reading is set to be less than said printing and bookbinding charge.

In structure (11), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled, and further, a charge for printing and bookbinding after reading is set to be less than said printing and bookbinding charge; thereby, it is possible to execute a licit and fair charge.

(12) A book on-demand system according to structure (9) or structure (10), wherein said charge for printing and bookbinding after reading is equivalent to the value which is obtained by subtracting a contents price from said printing and bookbinding charge.

In structure (12), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled, and further, a charge for printing and bookbinding after reading is equivalent to the value which is obtained by subtracting a contents price from a printing and bookbinding charge; thereby, it is possible to execute a licit and fair charge.

(13) A book on-demand system according to structure (9) or structure (10), wherein a charge for reading after printing, which is applied when a user having a history of performing printing and bookbinding receives reading data of the same contents, is set to be less than a reading charge, which is applied when a user having no history of performing printing and bookbinding receives reading data.

In structure (13), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled, and further, a charge for reading after printing, which is applied when a user having a history of performing printing and bookbinding receives reading data of the same contents, is set to be less than a reading charge, which is applied when a user having no history of performing printing and bookbinding receives reading data; thereby, it is possible to execute a licit and fair charge.

(14) A book on-demand system according to structure (9) or structure (10), wherein a charge for reading after printing is not applied when a user having a history of performing printing and bookbinding receives reading data of the same contents.

In structure (14), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled, and further, a charge for reading after printing is not applied when a user having a history of performing printing and bookbinding receives reading data of the same contents; thereby, it is possible to execute a licit and fair charge.

(15) A book on-demand system according to structure (9) or structure (10), wherein a charge for reading after reading, which is applied when a user having a history of receiving reading data receives reading data of the same contents, is set to be less than a reading charge which is applied when a user having no history of receiving reading data receives reading data.

In structure (15), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled, and further, a charge for reading after reading, which is applied when a user having a history of receiving reading data receives reading data of the same contents, is set to be less than a reading charge which is applied when a user having no history of receiving reading data receives reading data; thereby, it is possible to execute a licit and fair charge.

(16) A book on-demand system according to structure (9) or structure (10), wherein a charge for reading after reading is not applied when a user having a history of receiving reading data receives reading data of the same contents.

In structure (16), a reading charge includes a contents price for book contents, and a printing and bookbinding charge includes the contents price and a container price for performing printing and bookbinding, and also a reading charge applied to reading data transmission only, a printing and bookbinding charge applied to printing and bookbinding processing only and a charge for printing and bookbinding after reading, which is applied when a user having a history of receiving reading data performs printing and bookbinding, are separately handled, and further, a charge for reading after reading is not applied when a user having a history of receiving reading data receives reading data of the same contents; thereby, it is possible to execute a licit and fair charge.

(17) A book on-demand system having reading data for reading book contents and printing and bookbinding data for printing and bookbinding on the server thereof and also having a function to transmit the reading data to a reading means via a network according to a user's request and also transmit the printing and bookbinding data to a printing and bookbinding means, wherein, when an order is placed, the user terminal's screen displays input buttons for selecting either reading data to be transmitted via a network or printing and bookbinding data to be used for printing out a book and bookbinding.

Moreover, the input buttons for selecting either reading data transmission or printing and bookbinding processing can be displayed within the same screen or within the same page.

In structure (17), when an order is placed, the user terminal's screen displays input buttons for selecting either reading data to be transmitted via a network or printing and bookbinding data to be used for printing out a book and bookbinding; thereby, it is possible to integrate a book on-demand system for reading and a book on-demand system for printing and bookbinding into an easy-to-use, book on-demand system.

(18) A book on-demand system having reading data for reading book contents and printing and bookbinding data for printing and bookbinding on the server thereof and also having a function to transmit the reading data to a reading means via a network according to a user's request and also transmit the printing and bookbinding data to a printing and bookbinding means, wherein when an order is placed, the user terminal's screen displays input buttons for selecting either reading data to be transmitted via a network or printing and bookbinding data to be used for printing out a book and bookbinding and also displays the same user's history of receiving reading data or performing printing and bookbinding concerning the same contents.

In structure (18), when an order is placed, the user terminal's screen displays input buttons for selecting either reading data to be transmitted via a network or printing and bookbinding data to be used for printing out a book and bookbinding and also displays the same user's history of receiving reading data or performing printing and bookbinding concerning the same contents; therefore, it is possible to integrate a book on-demand system for reading and a book on-demand system for printing and bookbinding into an easy-to-use, book on-demand system.

(19) A book on-demand system having reading data for reading book contents and printing and bookbinding data for printing and bookbinding on the server thereof and also having a function to transmit the reading data to a reading means via a network according to a user's request and also transmit the printing and bookbinding data to a printing and bookbinding means, wherein when an order is placed, the user terminal's screen displays input buttons for selecting either reading data to be transmitted via a network or printing and bookbinding data to be used for printing out a book and bookbinding and also displays the same user's history of receiving reading data or performing printing and bookbinding concerning the same contents and further displays the amount of charges which reflects said history.

In structure (19), when an order is placed, the user terminal's screen displays input buttons for selecting either reading data to be transmitted via a network or printing and bookbinding data to be used for printing out a book and bookbinding and also displays the same user's history of receiving reading data or performing printing and bookbinding concerning the same contents and further displays the amount of charge which reflects the history (i.e., the amount of charge reflecting each user's discount status); thereby, it is possible to integrate a book on-demand system for reading and a book on-demand system for printing and bookbinding into an easy-to-use, book on-demand system.

BRIEF DESCRIPTION OF THE DRAWINGS

FIG. 5 is an explanatory drawing that shows an example of a screen displayed on a user terminal when an order is placed in a book on-demand system which is an embodiment of the present invention.

FIG. 6 is an explanatory drawing that shows an another example of a screen displayed on a user terminal when an order is placed in a book on-demand system which is an embodiment of the present invention.

DETAILED DESCRIPTION OF THE PREFERRED EMBODIMENTS

Hereinafter, embodiments of the present invention will be described in detail with reference to the drawings.

(System Configuration)

Figure 1:
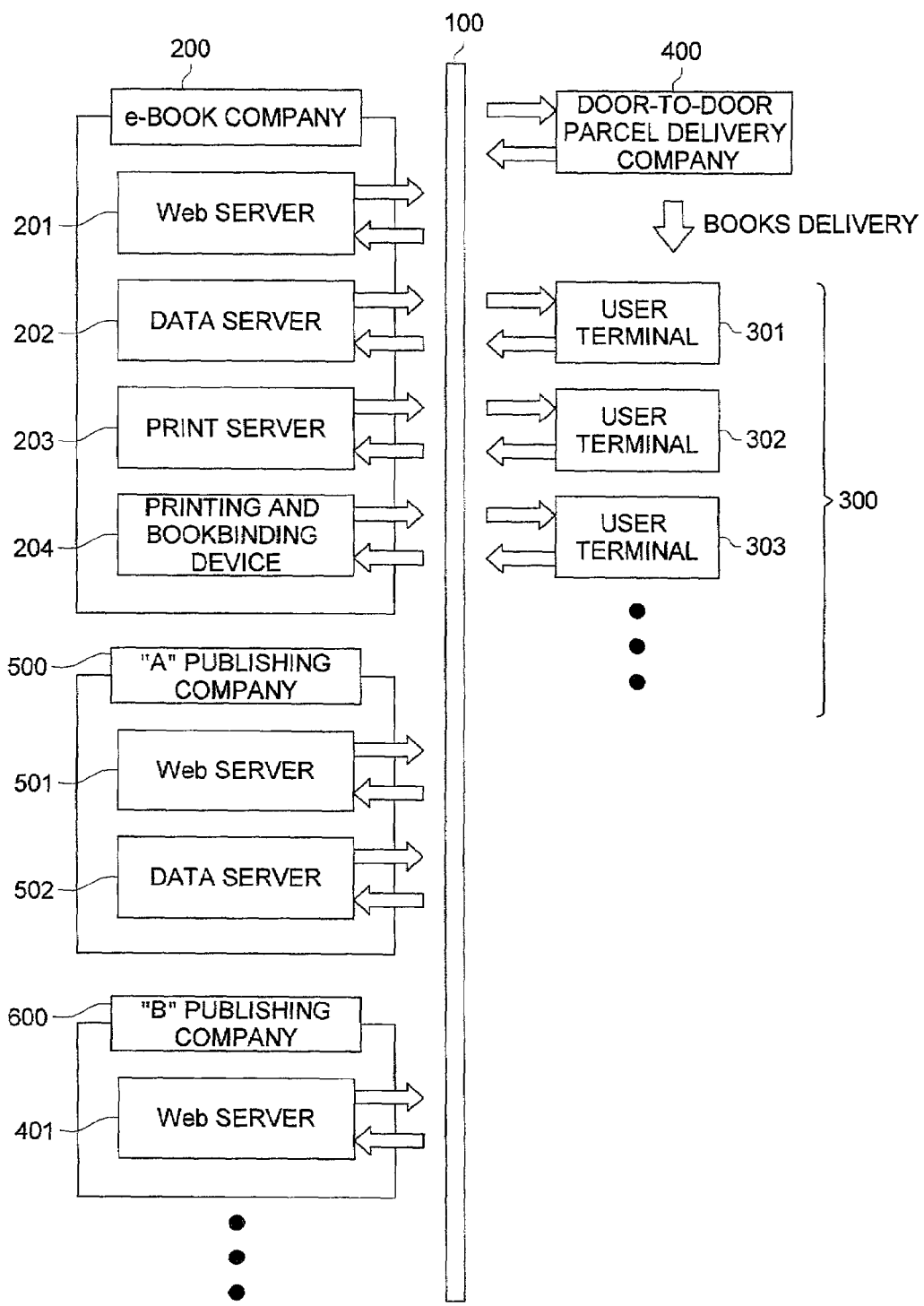
FIG. 1 is a block diagram that shows a structure of a book on-demand system which is an embodiment of the present invention.

FIG. 1 is a block diagram that illustrates a functional block to show the system configuration of a book on-demand system of this embodiment.

A book on-demand system of this embodiment mainly consists of a network 100 which transfers various data, an electronic publications transmission and printing system 200 which integrates an electronic publications system for transmitting reading data with a printing and bookbinding system for performing book printing and bookbinding, and user terminals 300 (user terminals 301 to 303 are shown in FIG. 1). Further, a door-to-door parcel delivery company 400 which delivers books created by performing printing and bookbinding by means of the electronic publications transmission and printing system 200 to users and also publishing companies 500 and 600 are connected to the network 100.

Furthermore, the network 100 is to include various networks, such as a LAN (local area network), the Internet which consists of mutually connected LANs, and the like. The Internet is a collective network established by normally and mutually connecting LANs provided by research institutes, public organizations, companies, and the like, by using WAN (wide area network) technology, and has naturally developed into a world-wide network. Nodes which are able to communicate by using a protocol (TCP/IP) used on the Internet can identify one another and communicate one another.

Moreover, the Internet uses an IP address as an identifier to identify each node. It is also possible to directly specify a file stored in each node by using a URL (uniform resource locater). Herein, a data server 202, a Web server 201, a print server 203, and a printing and bookbinding apparatus 204, with which an electronic book transmission and printing system 200 is equipped, are examples of such nodes.

Further, in the data server 202 which is managed and installed by the electronic publications transmission and printing system 200, digital data containing book contents (hereinafter, referred to as "book contents data") is stored in a large-capacity disk apparatus. This data server 202 transmits book contents data according to a request from the Web server 201 which has accepted the request from a user terminal 300. Moreover, the "book contents data" is to consist of "reading data" for reading book contents and "printing and bookbinding data" for performing printing and bookbinding.

Furthermore, in this embodiment, by using image format data, for reading data, which conforms to the image display density (e.g., 100 dots/25.4 mm) of the user terminal 300 display and is coarser than the printing and bookbinding data, it is possible to prevent the image data for reading from being diverted (making illicit copies) to the printing and bookbinding data. Further, the Web server 201 uses post script format data or PDF format data for printing and bookbinding data which is a different data format from that of the above-mentioned image data for reading, conforms to the image creation density (e.g., 600 dots/25.4 mm) of the image creating unit of the printing and bookbinding apparatus 204, is finer than the image data for reading, and is suitable for printing.

Figure 2:
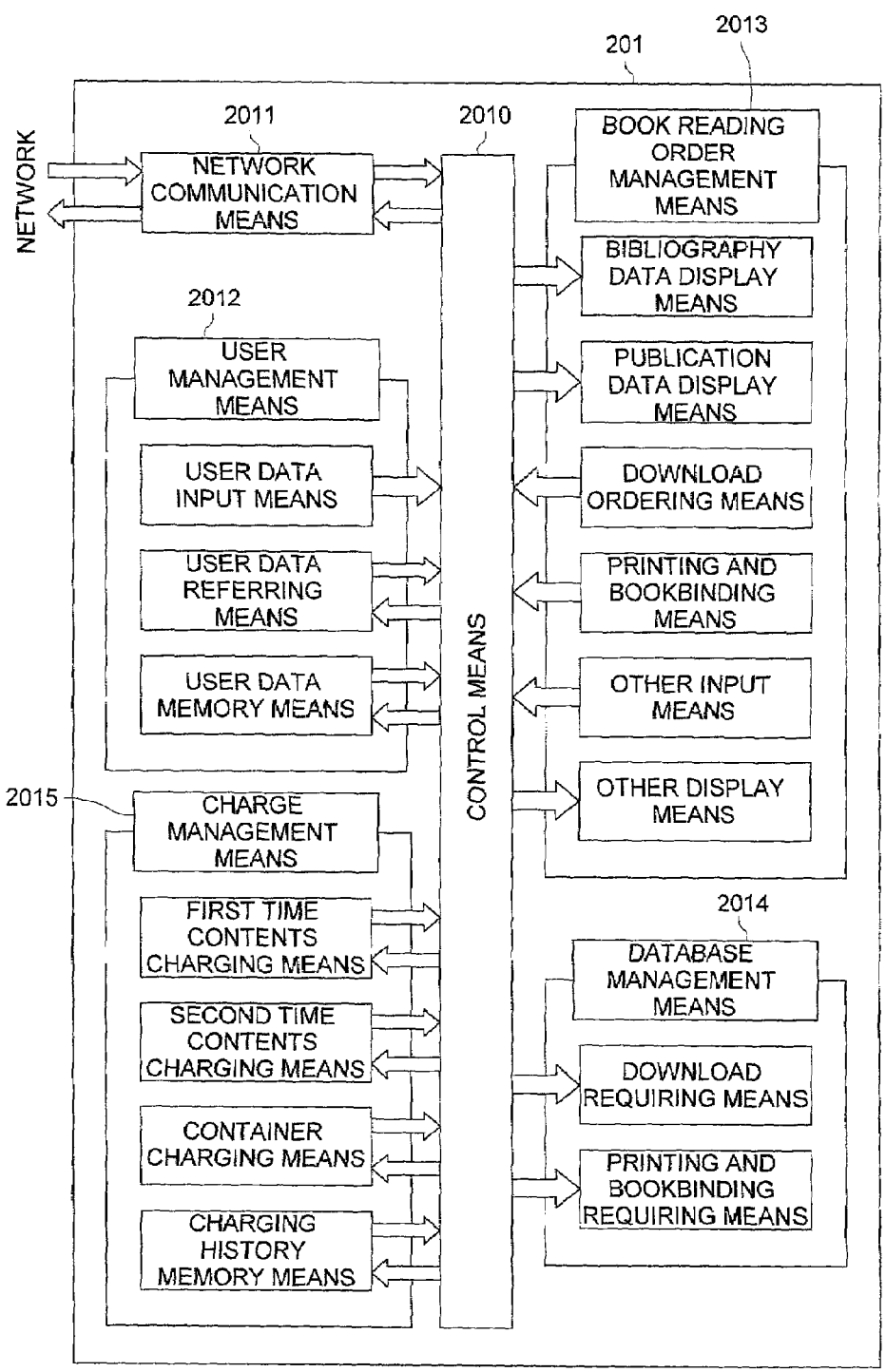
FIG. 2 is a block diagram that explains a detail structure of a Web server which is an embodiment of the present invention.

Moreover, the Web server 201, the detail structure of which is shown in FIG. 2, has a function to send reading data to a user terminal 300 (reading means) via a network 100 according to the user's request and to send printing and bookbinding data to a printing and bookbinding apparatus 204.

Furthermore, the Web server 201 consists of a control means 2010 for performing various controls of the server, a network communication means 2011 for performing communications via a network 100, a user management means 2012 for managing user data, a book reading order management means 2013 for managing orders for sending reading data and performing printing and bookbinding, a database management means 2014 for managing various data, and a charge management means 2015 for managing charges for reading data transmission and printing and bookbinding processing.

Moreover, upon sending reading data as described above, if necessary, a digital signature can be assigned by compression, encryption, or the like, before the reading data is sent.

Moreover, a Web server 501, a data server 502, and a Web server 401 are managed and installed by respective different publishing companies.

The Web server 501 has almost the same structure as the Web server 201 has, but does not have a charge management means. The Web server 501 performs user management, book reading order management, and database management by its own company, but leaves charge management to the Web server 201. The data server 502 stores book contents data different from the data stored in the data server 202 (digital data related to different books).

Further, the Web server 401 has almost the same structure as the Web server 201 has, but does not have a charge management means and a database management means. The Web server 401 performs user management and book reading order management by its own company, but leaves charge management and database management to the Web server 201.

The Web server 201, which is installed and managed, for example, by a management company that provides book contents data delivery services ("E-book printing company" in FIG. 1), converts individual book contents data stored in the data server 202 into image data for reading or printing data according to necessity so as to provide the data for a user terminal 300 or a printing and bookbinding apparatus 204.

A user terminal 300 (301,302, . . . ) is a terminal apparatus that can be owned or used by each user so that each user can place an order (a request for transmitting reading data or/and a request for transmitting printing and bookbinding data to a printing and bookbinding means, and the display of electronic publications data for reading).

Further, in the electronic publications transmission and printing system 200, the charge management means 2015 located in the Web server 201 performs charging processing for reading (processing charge for a contents price) according to the transmission of reading data, and calculates charges based on the bookbinding result sent from the printing and bookbinding apparatus 204 which has performed printing and bookbinding of the printing and bookbinding data, and then, based on the calculation result, performs charging processing for printing and bookbinding (processing charge for a contents price and a container price).

The Web server 201, the data server 202, the printing and bookbinding apparatus 204, and the user terminal 300 may mutually perform encrypted data communications by using the public key method. That is, each node decrypts a digital signature related to received data by using a sender's public key to identify the sender so as to prevent dissemblance by another node. Further, it is also possible to prevent illicit duplication by another node by encrypting transmitted data by means of the self secret key.

FIRST EMBODIMENT

The charging processing function of a book on-demand system of a first embodiment will be described below with reference to the flowcharts shown in FIGS. 3 and 4 and explanatory drawings shown in FIGS. 5 and 6.

Moreover, in this embodiment, a reading charge includes a "contents price" for book contents, and a printing and bookbinding charge includes the "contents price" and a "container price" for performing printing and bookbinding.

Further, a "price" is a value (amount of money) of information which users are requested to pay for receiving goods or services. Further, a "charge" is what users are requested to pay after the "priced" information has been transmitted and received via the system.

A user who chooses to read a book (display of reading data) or chooses the printing and bookbinding of a book (printing and bookbinding of printing and bookbinding data) makes a log-in request to the Web server 201 located in the electronic publications transmission and printing system 200 by operating a user terminal 300, such as a computer device or a portable terminal. The log-in makes it possible to connect a logical communication channel between the Web server 201 and the user terminal 300.

When receiving a log-in request, the Web server 201 checks the licitness of the log-in request, and when it is licit, the server authenticates the user terminal 300, thereby the following procedures can be executed by the user terminal 300. The log-in request from a user or a terminal which has been registered as a user of the book on-demand system in the Web server 201 is determined to be licit. And then, book data (title of book contents data, its price, author, publishing company, recommendation, and a part of the book contents data depending on the situation) which is equivalent to latest index data is sent to the user terminal 300.

Moreover, the Web server 201 displays input buttons as shown in FIG. 5 (display of input buttons for selecting "downloading of electronic publications" or "printing and bookbinding of electronic publications") together with the contents of the latest index data mentioned above. Herein, "downloading of electronic publications" means that reading data is sent from the electronic publications transmission and printing system 200 and received by the user terminal 300.

Figure 3:
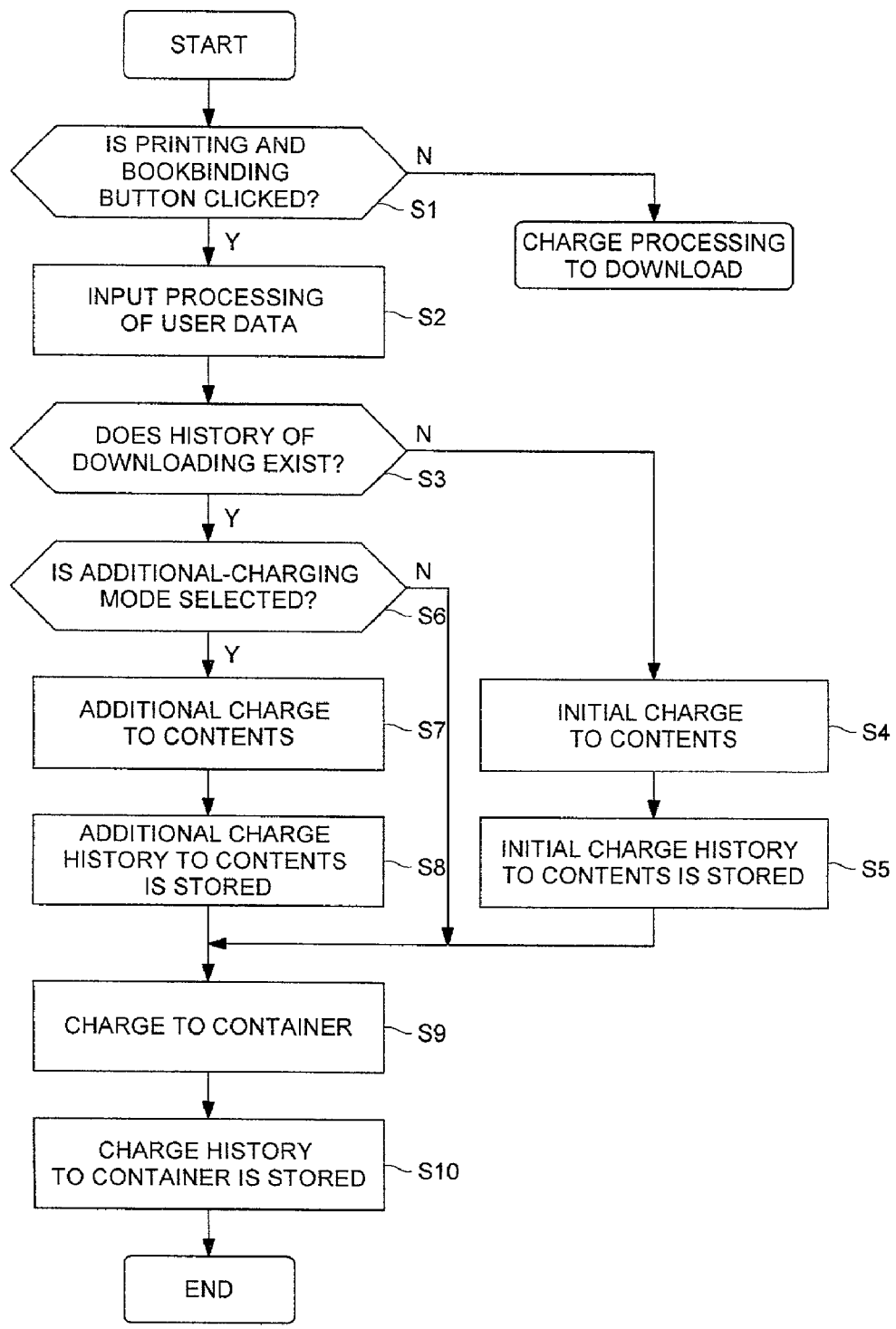
FIG. 3 is a flowchart that explains the action of a book on-demand system representing a plurality of charge amount determination means for reading charge data, which is a first embodiment of the present invention.

In the user terminal 300 that has received the latest index data, when a user decides to select a target book contents data from the above-mentioned latest index data for reading or for printing and bookbinding, the user make a request to the Web server 201 by clicking either one of the input buttons shown in FIG. 5 (S1 in FIG. 3).

Moreover, on the same display screen or on the same page as shown in FIG. 5, when an order is placed, the user terminal's screen displays input buttons for selecting either reading data to be transmitted via a network or printing and bookbinding data to be used for printing out a book and bookbinding. By doing so, users can easily understand the contents by simply looking at the display screen. As a result, it is possible to integrate an electronic publications system for reading and an electronic publications system for printing and bookbinding into an easy-to-use electronic publications system.

When a user chooses the printing and bookbinding of electronic publications by clicking the printing and bookbinding button (YES at S1 in FIG. 3), the user management means 2012 inputs user data and also retrieves and stores the input user data according to the direction of the control means 2010 located in the Web server 201 (S2 in FIG. 3).

Subsequently, according to the direction of the control means 2010 located in the Web server 201, the charge history storage means located in the charge management means 2015 retrieves the user's downloading history (history of downloading the same contents for reading) (S3 in FIG. 3).

When a downloading history does not exist (NO at S3 in FIG. 3), the contents to be used for printing and bookbinding at this time are purchased for the first time. Therefore, the charge management means 2015 performs usual initial charging processing for the contents (S4 in FIG. 3). In this initial charging processing, a specified price is charged for the contents. Further, the control means 2010 stores the data concerning the initial charging processing for the contents in the charge history storage means located in the charge management means (S5 in FIG. 3).

When a downloading history exists (YES at S3 in FIG. 3), the contents to be downloaded at this time are considered to be used for printing and bookbinding after they have been read. Therefore, the control means 2010 checks that the additional-charging mode (the mode concerning whether or not the re-downloading contents are charged again which is a less charge than the initial contents charge) has been set (S6 in FIG. 3).

When the additional-charging mode has been set (YES at S6 in FIG. 3), the charge management means 2015 applies an additional contents charge which is less than the initial contents charge to the printing and bookbinding processing at this time (S7 in FIG. 3). Further, the control means 2010 stores the data concerning the additional-charging processing for the contents in the charge history storage means located in the charge management means 2015 (S8 in FIG. 3).

When the additional-charging mode has not been set (NO at S6 in FIG. 3), the charge management means 2015 does not charge the contents for the printing and bookbinding at this time because a specified initial charge has already been applied to the contents.

Subsequently, the charge management means 2015 performs charging processing for the container price (S9 in FIG. 3). Further, the control means 2010 stores the data concerning the charging processing for the container price in the charge history storage means located in the charge management means 2015 (S10 FIG. 3).

As described above, in this embodiment, the printing and bookbinding charge for printing and bookbinding only (initial charge for the contents plus container charge) is separately handled from the charge for printing and bookbinding after reading (additional charge for the contents or no charge for the contents plus container charge) which is applied when a user having a history of receiving reading data performs printing and bookbinding only. Accordingly, it is possible to execute a licit and fair charge.

That is, in this embodiment, reading charge data (contents charge data) concerning reading charge (contents charge) which is applied to the reading data transmission is separately handled from printing and bookbinding charge data (container charge data) concerning printing and bookbinding charge (container charge) which is applied to the printing and bookbinding processing, in the same electronic publications system. Accordingly, when a user having a history of receiving reading data uses the printing and bookbinding data of the same contents, the charge is reduced; thereby, it is possible to execute a licit and fair charge.

Moreover, when such price reduction is performed, it is preferable that the amount of the downloading charge, printing and bookbinding charge, and a reduced charge for a user having a history be displayed near the downloading button or near the printing and bookbinding button, as shown in FIG. 6. As described above, when an order is placed, the user terminal's screen displays input buttons for selecting either reading data to be transmitted via a network or printing and bookbinding data to be used for printing out a book and bookbinding and also shows the same user's history of receiving reading data or performing printing and bookbinding of the same contents and further shows the amount of charge which reflects the user's history. As a result, it is possible to integrate an electronic publications system for reading and an electronic publications system for printing and bookbinding into an easy-to-use electronic publications system.

SECOND EMBODIMENT

Figure 4:
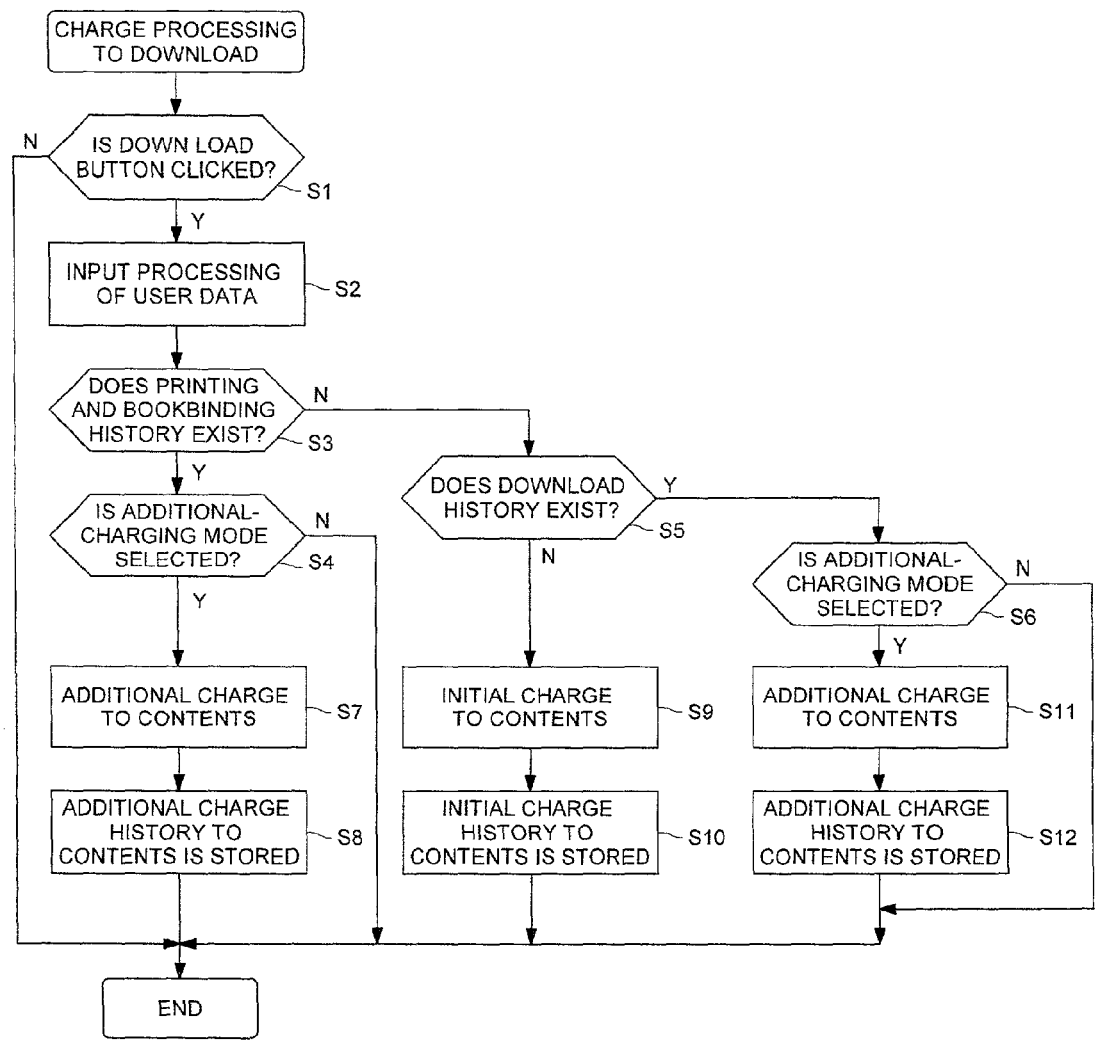
FIG. 4 is an another flowchart that explains the action of a book on-demand system representing a plurality of charge amount determination means for printing and bookbinding charge data, which is a first embodiment of the present invention.

When a user does not click the printing and bookbinding button within a specified time (NO at S1 in FIG. 3), the process moves on to the routine for processing a downloading charge (FIG. 4).

When a user chooses the downloading of electronic publications (request for reading data transmission) by clicking the downloading button (see FIG. 5) (YES at S1 in FIG. 4), the user management means 2012 inputs user data and also retrieves and stores the input user data according to the direction of the control means 2010 located in the Web server 201 (S2 in FIG. 4).

Subsequently, according to the direction of the control means 2010 located in the Web server 201, the charge history storage means located in the charge management means 2015 retrieves the user's printing and bookbinding history (history of downloading the same contents for printing and bookbinding) (S3 in FIG. 4).

When a printing and bookbinding history exists (YES at S3 in FIG. 4), the contents to be downloaded at this time are considered to be downloaded after printing and bookbinding have been performed. Therefore, the control means 2010 checks that the additional-charging mode (the mode concerning whether or not the re-downloading contents which have a printing and bookbinding history are charged again which is a less charge than the initial contents charge) has been set (S4 in FIG. 4).

When the additional-charging mode has been set (YES at S4 in FIG. 4), the charge management means 2015 applies an additional contents charge which is less than the initial contents charge to the printing and bookbinding processing at this time (S7 in FIG. 4). Further, the control means 2010 stores the data concerning the additional-charging processing for the contents in the charge history storage means located in the charge management means 2015 (S8 in FIG. 4).

When the additional-charging mode has not been set (NO at S4 in FIG. 4), the charge management means 2015 does not charge the contents for the printing and bookbinding at this time because a specified initial charge has already been applied to the contents.

When a printing and bookbinding history does not exist (NO at S3 in FIG. 4), according to the direction of the control means 2010 located in the Web server, the charge history storage means located in the charge management means 2015 retrieves the user's downloading history (history of downloading the same contents for reading) (S5 in FIG. 4).

When neither a printing history nor a downloading history exists (NO at S3 and S5 in FIG. 4), the charge management means 2015 charges usual initial charge for the contents (S9 in FIG. 4) because the contents to be downloaded at this time is purchased for the first time. In this process, a specified amount of charge is applied to the contents. Further, the control means 2010 stores the data concerning the initial charging processing for the contents in the charge history storage means located in the charge management means 2015 (S10 in FIG. 4).

If a printing and bookbinding history does not exist (NO at S3 in FIG. 4), but a downloading history exists (YES at S5 in FIG. 4), the contents to be downloaded at this time are considered to be downloaded after they have been downloaded (re-downloading). Therefore, the control means 2010 checks that the additional-charging mode (the mode concerning whether or not the re-downloading contents which have a downloading history are charged again <a less charge than the initial contents charge> has been set (S6 in FIG. 4).

When the additional-charging mode has been set (YES at S6 in FIG. 4), the charge management means 2015 applies an additional contents charge which is less than the initial contents charge to the printing and bookbinding processing at this time (S11 in FIG. 4). Further, the control means 2010 stores the data concerning the additional-charging processing for the contents in the charge history storage means located in the charge management means 2015 (S12 in FIG. 4).

When the additional-charging mode has not been set (NO at S6 in FIG. 4), the charge management means 2015 does not charge the contents for the printing and bookbinding at this time because a specified initial charge has already been applied to the contents.

As described above, in this embodiment, a contents charge for reading data transmission only (initial charge for the contents), a charge for reading after reading (additional charge for the contents or no charge for the contents) which is applied when a user having a history of receiving reading data makes a request for reading data transmission, and a charge for reading after printing and bookbinding (additional charge for the contents or no charge for the contents), which is applied when a user having a history of printing and bookbinding makes a request for reading data transmission, are separately handled; thereby, it is possible to execute a licit and fair charge.

That is, in this embodiment, reading charge data (contents charge data) concerning reading charge (contents charge) which is applied to the reading data transmission is separately handled from printing and bookbinding charge data (container charge data) concerning printing and bookbinding charge (container charge) which is applied to the printing and bookbinding processing, in the same electronic publications system. Accordingly, when a user having a history of using reading data uses reading data of the same contents, or when a user having a history of using printing and bookbinding data uses reading data of the same contents, the charge is reduced; thereby, it is possible to execute a licit and fair charge.

Moreover, when such price reduction is performed, it is preferable that the amount of the downloading charge, printing and bookbinding charge, presence or absence of a history, and a reduced charge for a user having a history be displayed near the downloading button or near the printing and bookbinding button, as shown in FIG. 6. In an example shown herein, the reduced price by Japanese 500 yen (amount of final charge) is displayed because the user has a history. Moreover, it is also possible to display the amount of discount by showing "¥500 is discounted".

As described above, when an order is placed, the user terminal's screen displays input buttons for selecting either reading data to be transmitted via a network or printing and bookbinding data to be used for printing out a book and bookbinding, and also shows the same user's history of receiving reading data or performing printing and bookbinding of the same contents, and further shows the amount of charge which reflects the user's history. As a result, it is possible to integrate an electronic publications system for reading and an electronic publications system for printing and bookbinding into an easy-to-use electronic publications system.

Moreover, in the above-mentioned embodiments, when printing and bookbinding is repeatedly performed, it is preferable that the charge is not reduced because that is the case where books are repeatedly sold.

As described above, in the present invention, a charge is to be reduced when the same user reads the same contents again or performs printing and bookbinding of the same contents again. Accordingly, it is possible to provide a book on-demand system which enables users to quickly and accurately obtain publications by means of electronic publishing, making a licit payment at a fair charge.

Further, in the present invention, when an order is placed, the user terminal's screen displays input buttons for selecting either reading data to be transmitted via a network or printing and bookbinding data to be used for printing out a book and bookbinding, and also shows the same user's history of receiving reading data or performing printing and bookbinding of the same contents, and further shows the amount of charge which reflects the user's history. As a result, it is possible to integrate an electronic publications system for reading and an electronic publications system for printing and bookbinding into an easy-to-use electronic publications system.

What is claimed is:

1. A book on-demand system comprising:
   (a) a server having viewing data for viewing book contents and printing and bookbinding data for printing and bookbinding for transmitting the viewing data in the server to a viewing device on a user side through a network at a user's request; and
   (b) a printing and bookbinding device to which the printing and bookbinding data is transmitted from the server; and
   (c) a judging device to judge whether a user has a history of receiving viewing data of the book contents,
   wherein the server separately decides a first charge applied to viewing data transmission only, a second charge applied to printing and bookbinding processing only and a third charge for printing and bookbinding after viewing, according to the result of the judging device.

2. The book on-demand system of claim 1, wherein said first charge includes a contents price for book contents, and said second charge includes the contents price and a container price for performing printing and bookbinding.

3. The book on-demand system of claim 1, wherein said third charge is set to be less than said second charge applied to printing and bookbinding processing only.

4. The book on-demand system of claim 1, wherein said third charge is equivalent to a value which is obtained by subtracting a contents price from said second charge.

5. The book on-demand system of claim 1, wherein a fourth charge for viewing after printing, which is applied when a user having a history of performing printing and bookbinding receives reading data of the same contents, is set to be less than a viewing charge, which is applied when a user having no history of performing printing and bookbinding receives data.

6. The book on-demand system of claim 1, wherein a fourth charge for viewing after printing is not applied when a user having a history of performing printing and bookbinding receives viewing data of the same contents.

7. The book on-demand system of claim 1, wherein a fifth charge for viewing after viewing, which is applied when a user having a history of receiving viewing data receives viewing data of the same contents, is set to be less than a viewing charge which is applied when a user having no history of receiving viewing data receives viewing data.

8. The book on-demand system of claim 1, wherein a fifth charge for viewing after viewing is not applied when a user having a history of receiving viewing data receives viewing data of the same contents.

9. The book on-demand system of claim 1,
wherein when an order is placed, the server displays in a user terminal's screen a display image provided with input buttons for selecting either viewing data to be transmitted through a network or printing and bookbinding data to be used for printing out a book and bookbinding.

10. The book on-demand system of claim 9, wherein the server displays the same user's history of receiving viewing data or performing printing and bookbinding in relation to the same contents.

11. The book on-demand system of claim 10, wherein the server displays the amount of charges which reflects said history.

12. The book on-demand system of claim 2, wherein the server comprises a first time contents charging device which charges the contents price when the judgment device that the user has no history of receiving viewing data.

13. The book on-demand system of claim 2, wherein the server comprises a second time contents charging device which charges the contents price when the judgment device that the user has at least one history of receiving viewing data.

14. The book on-demand system of claim 2, wherein the server comprises a container charging device which charges the container charge when the user selects the printing and bookbinding.

15. The book on-demand system of claim 1, wherein said server comprises a storage device which stores the history.

16. A book on-demand system comprising:
(a) a server having viewing data for viewing book contents and printing and bookbinding data for printing and bookbinding for transmitting the viewing data in the server to a viewing device on a user side through a network at a user's request;
(b) a printing and bookbinding device to which the printing and bookbinding data is transmitted from the server;
(c) a first judging device to judge whether a user has a history of receiving viewing data of the book contents; and
(d) a second judging device to judge whether a user has a history of performing printing and bookbinding of the book contents;
wherein the server separately decides a first charge applied to viewing data transmission and a second charge applied to printing and bookbinding processing according to the result of the first judging device and to second judging device.

17. The book on-demand system of claim 16, wherein said first charge includes a contents price for book contents, and said second charge includes the contents price and a container price for performing printing and bookbinding.

18. The book on-demand system of claim 17, wherein the server decides the contents price according to the result of the first judging device and the second judging device.

19. The book on-demand system of claim 16, wherein said server comprises a storage device which stores the history of receiving viewing data.

20. The book on-demand system of claim 16, wherein said server comprises a storage device which stores the history of performing printing and bookbinding.

* * * * *